United States Patent [19]

Weissbacher

[11] Patent Number: 4,704,066
[45] Date of Patent: Nov. 3, 1987

[54] TURBINE OR COMPRESSOR GUIDE BLADE AND METHOD OF MANUFACTURING SAME

[75] Inventor: Georg Weissbacher, Alpen, Fed. Rep. of Germany

[73] Assignee: MAN Gutehoffnungshütte GmbH, Fed. Rep. of Germany

[21] Appl. No.: 852,996

[22] Filed: Apr. 17, 1986

[30] Foreign Application Priority Data

Apr. 19, 1985 [DE] Fed. Rep. of Germany ....... 3514122

[51] Int. Cl.$^4$ ............................ F03B 3/18; B21K 3/04
[52] U.S. Cl. ........................................ 415/191; 72/67;
72/316; 416/213 R; 416/241 R; 29/156.8 B;
29/23.5; 29/DIG. 49
[58] Field of Search ......... 29/157.8 B, 23.5, DIG. 49;
72/67, 316, 318; 415/191; 416/241 R, 213 R

[56] References Cited

U.S. PATENT DOCUMENTS

| 1,260,588 | 3/1918 | Steenstrup | 29/156.8 B |
| 1,470,500 | 10/1923 | Steenstrup | 416/213 |
| 2,373,827 | 4/1945 | Halford et al. | 29/156.8 B X |
| 2,959,843 | 11/1960 | Uitvlugt | 29/156.8 B |

Primary Examiner—Howard N. Goldberg
Assistant Examiner—Ronald S. Wallace
Attorney, Agent, or Firm—McGlew and Tuttle

[57] ABSTRACT

A method for the manufacture of a guide blade for a turbine or compressor guide wheel, uses a profiled bar of heat and corrosion resistant metal that is cut to oversize length. This is in preparation for soldering the bar into a guide wheel, with the bar having at least at one end a baselike thickening which is upset in a cold state, and with a soldering surface formed in its inner zone.

11 Claims, 5 Drawing Figures

TURBINE OR COMPRESSOR GUIDE BLADE AND METHOD OF MANUFACTURING SAME

FIELD AND BACKGROUND OF THE INVENTION

The invention relates to a method for the manufacture of a guide blade for a turbine or compressor guide wheel, through the use of a profiled bar of heat and corrosion resistant metal that is cut to an oversize length, in particular in preparation for soldering into the guide wheel, as well as a guide blade manufactured according to the method.

Guide blades for a turbine guide wheel are known that are formed with a profiled base. It is known that the guide blade with said base is inserted in a compatibly profile-shaped groove in the blade carrier and that the outer ring, the so-called covering rim of the guide wheel, is riveted on. To this end, the guide blade is formed at the head end with a pin provided for riveting.

Another known manufacture of a vane ring and one often applied in the present state of the art consists in that the guide blades are joined by butt soldering at the base end and at the head end, respectively, to the inner and outer vane ring, respectively. Through use of, for example, gold-nickel solder 80 Au/20 Ni, high-strength soldered joints able to withstand high stress are soldered under protective gas or in vacuum, which are eminently suitable for stresses under permanent operating temperatures of up to 400° C. In the case of higher operating temperatures, for example, a palladium-nickel solder 60 Pd/40 Ni melting at a temperature about 300° C. higher is advantageously used. The mechanical properties of the soldered joints obtained with these solders are about 20% below the ultimate stress values of the material of the parts to be soldered.

With regard to the required strength, especially given the stresses arising in the vane ring due to different thermal expansions, the soldered joint constitutes the weakest link of a chain of ultimate stress values. In addition, during butt soldering of a guide blade standing essentially vertically on the base, the soldered joint is under critically high stress, due to concentration of the magnetic flux in the edge area of the blade contour, in the nature of a notch effect.

SUMMARY OF THE INVENTION

It is the object of the invention to provide a method for the manufacture of a guide blade for a turbine guide wheel, especially for soldering the blade on the guide wheel, which provides relief from the reduction of strength of the soldered joint in relation to the basic material of the guide blade and rings that heretofore resulted during butt welding, without reducing the manufacturing advantages of butt soldering, without impairing the material structure of the guide blade, and particularly without substantially increasing the manufacturing cost.

The invention has the further object of indicating a turbine or compressor guide blade suitable to be soldered into a vane ring, especially one manufactured according to the method of the invention.

The solution of the problem is successfully achieved with a method for manufacturing a guide blade for a turbine or compressor guide wheel through the use of a profiled bar cut to an oversize length, in that according to the invention a base-like thickening is upset in the cold state at least at one end of the bar and that in the zone of said thickening a soldering surface is formed.

Advantageously, a substantially enlarged soldering surface is formed by the method in the zone of the baselike thickening in a surprisingly simple manner, with a continuous transition towards the widened soldering surface, particularly with an improvement of the path of the lines of force. The strength of the soldered joint is thereby significantly increased due to a substantially enlarged soldering surface, as compared to the strength of the guide blade in the region of its original profile. In relation to the advantage resulting therefrom, the expense of energy for the upsetting operation is relatively low. The expenditure for the soldering process per se remains essentially unchanged.

An embodiment of the invention provides that the zone of the cold deformation achieved through upsetting has a depth in the axial direction that is relatively small in relation to the width of the baselike thickening.

It is thereby advantageously achieved that particularly the base-side edge zone of the flow of the flowing medium seized by the guide blade is not impaired. Moreover, through the small axial depth of the upsetting zone it is achieved that only a relatively small amount of material need be caused to flow during the cold deformation, as a result of which the deformation work to be expended thereon is kept to relatively narrow limits.

In order to attain an advantageous optimal result of the deformation with as small as possible an expenditure of energy, the embodiment provides further that the upsetting of the end of the bar is effected with a rapid sequence of constant partial deforming impulses in the cold-plastic state of the material, with the aid of a riveting process. In particular, it is advantageously provided that the upsetting be carried out with the aid of a staggered riveting process.

A substantial advantage of the riveting process and of the staggered riveting proces in particular consists in that the radial deformation outweighs the tangential deformation of the workpiece and that as a result a baselike thickening is made possible with an even transition and relatively shallow depth in the axial direction, with as small as possible an expenditure of deforming work.

Advantageously, on a guide blade blank that has a thickening on both sides, the upsetting of the two bar-ends is carried out simultaneously in a tandem process with two opposed riveting units. By this special way of working, a reduction in time and expense of the deformation work is attained, and the forces acting on the bar are at least partially reciprocally compensated, and the clamping device is thereby relieved.

In addition, an advantageous embodiment of the method provides that from a double-length, oversized blank profiled bar, two guide bar blanks intended for finishing are produced by a simultaneous two sided exchange of baselike thickenings of the two ends and a central separation thereon following. The economy of the manufacturing process is thereby further improved.

Depending on the position of a guide blade in the vane ring, a further embodiment of the method provides that the plane of the upsetting work and thereby the main direction of the deformation shows an obtuse angle to the longitudinal axis of the guide-blade blank. And lastly, the manufacturing method provides in the end phase that after completion of the upsetting process, the guide-blade blank is cut to length at both sides and that the upset end is burred, the soldering surfaces at the ends are produced true to size through machining, and are fine finished and lastly deburred all around.

A turbine guide-blade blank manufactured according to the method of the invention, especially for soldering into a vane ring, has at least at the outer end a cold-upset baselike thickening which is formed with a soldering surface at its end.

In addition, the guide blade manufactured according to the invention is characterized in that the material of the blank has in the region of the baselike thickening a particularly fine-grained structure that is modified in comparison to the basic material by way of cold compressing in the plastic state.

Advantageously, a characteristic feature of the staggered riveting process is obtained in that the structure of the guide blade in the region of the thickening has substantially no or only a very minor core or edge zone hardening, and as a result, the structural toughness required for a guide blade is essentially unchanged.

And finally, the guide blade blank of the invention has an upset soldering surface which is substantially enlarged in relation to the sectional area of the bar, and is particularly considerably widened in relation to the blade profile.

The invention is shown in the drawings in a preferred embodiment; additional advantageous details of the invention can be gathered from the drawings.

DESCRIPTION OF THE PREFERRED EMBODIMENTS

Figure 1:
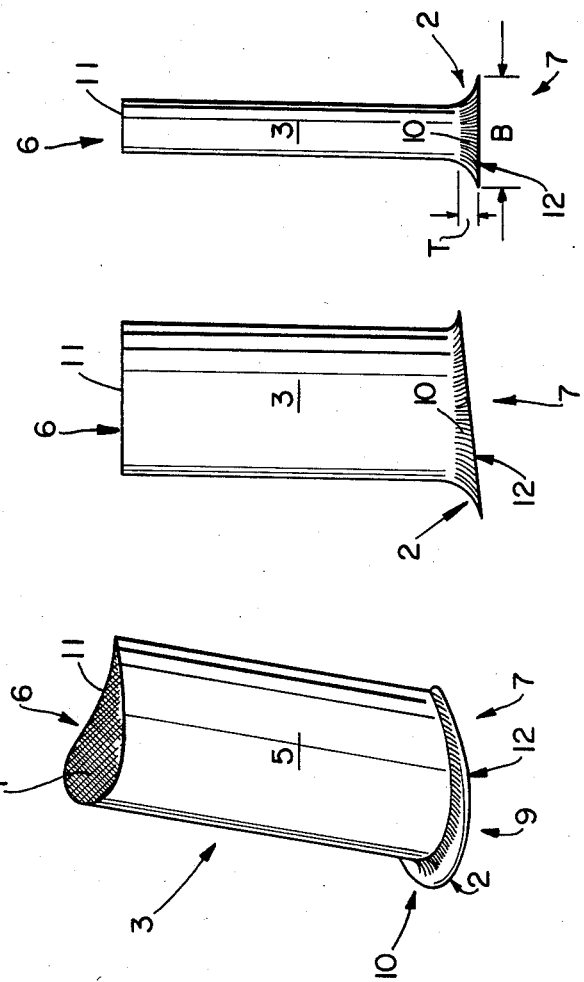
FIGS. 1a through 1c show a guide blade for a turbine guide wheel, in perspective view, in side view and in front view, respectively

The guide blade 3 in FIG. 1a is made of an initially axially oversized profiled bar 5 cut from a profile-drawn blank. It has a head part 6 and a base part 7. For the production of a ready-to-mount guide blade 3, particularly for the preparation for soldering in a guide wheel, a baselike thickening 2 was upset on bar 5 at base part 7, in accordance with the invention, and in the region of said thickening, at the bottom side 9, a soldering surface 12 was formed.

Considering FIGS. 1a, 1b and 1c together, it can be seen that the zone 10 of the cold deformation obtained through upsetting has a relatively smaller depth T in the axial direction in comparison to the width B of the baselike thickening 2 in a transverse direction. The guide blade 3, machined and ready for the soldering process, is formed after the upsetting of the baselike thickening 2 through true-to-measure cutting to length at the head part 6 and at the base part 7 with a soldering surface 11 at the head end and with a soldering surface 12 at the base end. Both soldering surfaces are worked up through machining such as grinding or fine finishing milling true-to-measure and with a plane surface from the initially axially oversized material of head part 6 and base part 7.

The ready-for-soldering guide blade shown according to FIGS. 1a, 1b and 1c is formed with a cold upset thickening only at the base end 7. However, it is left to the discretion of the specialist to have the head end soldering surface 11 in some cases shaped with a thickening (not shown) in the exemplified embodiment, should this prove necessary for reasons of strength and stability. The zone 10 of the upset thickening 2 visible in FIGS. 1a through 1c is produced by a per se known staggered riveting process. This type of manufacture is of great advantage because with it the radial deformation outweighs the tangential deformation. In this manner there is obtained, as can be seen particularly in FIG. 1c, the per se small axial depth T of the upsetting with a flat-oblique course at both sides towards soldering surface 12. In this manner an interference with or even breakdown of the flow in the zone of the baselike thickening 2 is prevented, with great advantage to the flow conductance of the guide blade.

Furthermore, through the staggered riveting process a very careful deformation of the material is obtained in comparison with other processes, in that the riveting set touches down on the workpiece at highest possible speed and immediately causes the material to flow cold at the point of action, without a substantial core or edge zone hardening taking place as a result. The tumbler movement and direct-acting, tensional motion of an appropriate riveting unit see to it that during the respective short time of its plastic state the material is permanently deformed without break of the material's fiber. Riveting times of the order of, e.g., one to several seconds are thereby attained.

As can be seen from the representation of the guide blade embodiment in base part 7, the thickening 2 of zone 10 obtained through upsetting brings about an enlargement of the soldering surface 12 by a factor estimated at between 1.5 and 2 in comparison with that recognizable at, for example, the sectional surface F of bar 5 at the head part 6 of FIG. 1a. In this way, the strength of the soldering surface is increased by said factor over a pure butt soldering without enlargement of the cross section. A further increase results because the steady transition of the profiled material to the upset thickening 2, causes a substantially improved flux of the lines of force from the inner ring of the vane ring to the guide blade, and thereby the notch stress present in an unthickened butt soldering is prevented.

Figure 2:
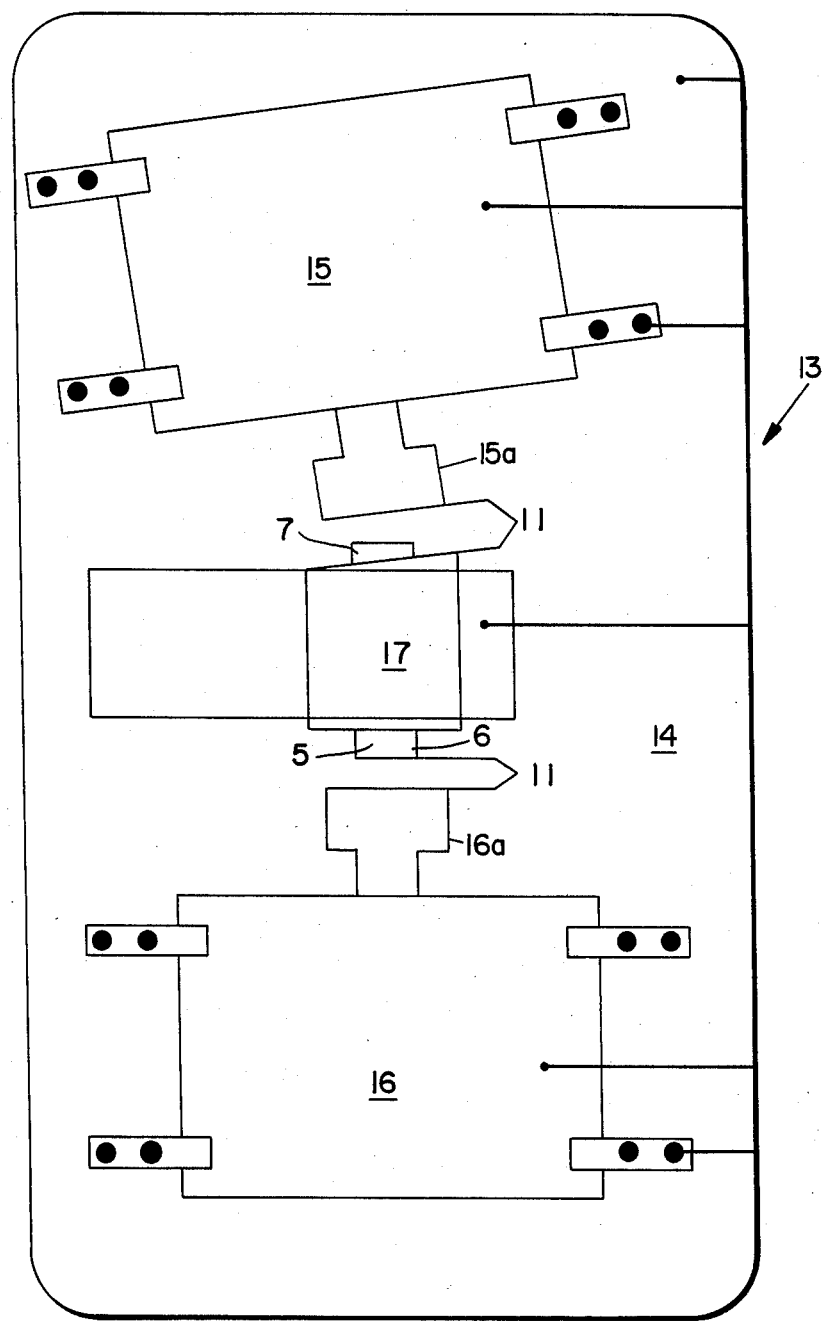
FIG. 2 shows a guide blade in a clamping device, during processing by two staggered riveting units of an upsetting device working in a tandem process, in plan view.

FIG. 2 shows a concept of an upsetting device 13. Two staggered riveting units 15, 16 are clamped on a base plate 14. The profiled bar 5 to be machined is firmly clamped in a clamping unit 17 in such a manner that its head part 6 and its base part 7 protrude from opposite sides of the clamping unit 17.

Assuming that the staggered riveting process is known to the specialist, the function of the upsetting device requires no further explanation. Each upsetting device 15,16 has a hammer 15a, 16a that moves reciprocally to strike the ends of blank 5. The inclination of the riveting unit 15 in an obtuse angle to the longitudinal axis of blank 5 that is to be machined, causes the one-sided oblique upsetting in the manner provided for, as is clearly seen particularly in FIG. 1b. With the two-sided machining shown in FIG. 2, it may concern a guide blade embodiment in which at each of head part 6 and base part 7 a thickening 2 is to be upset. On the other hand, the arrangement may have been made in this manner, in order to obtain in an opposite riveting action a compensation of the forces of the thickening blows acting on the blank 5 in the axial direction.

Figure 3:
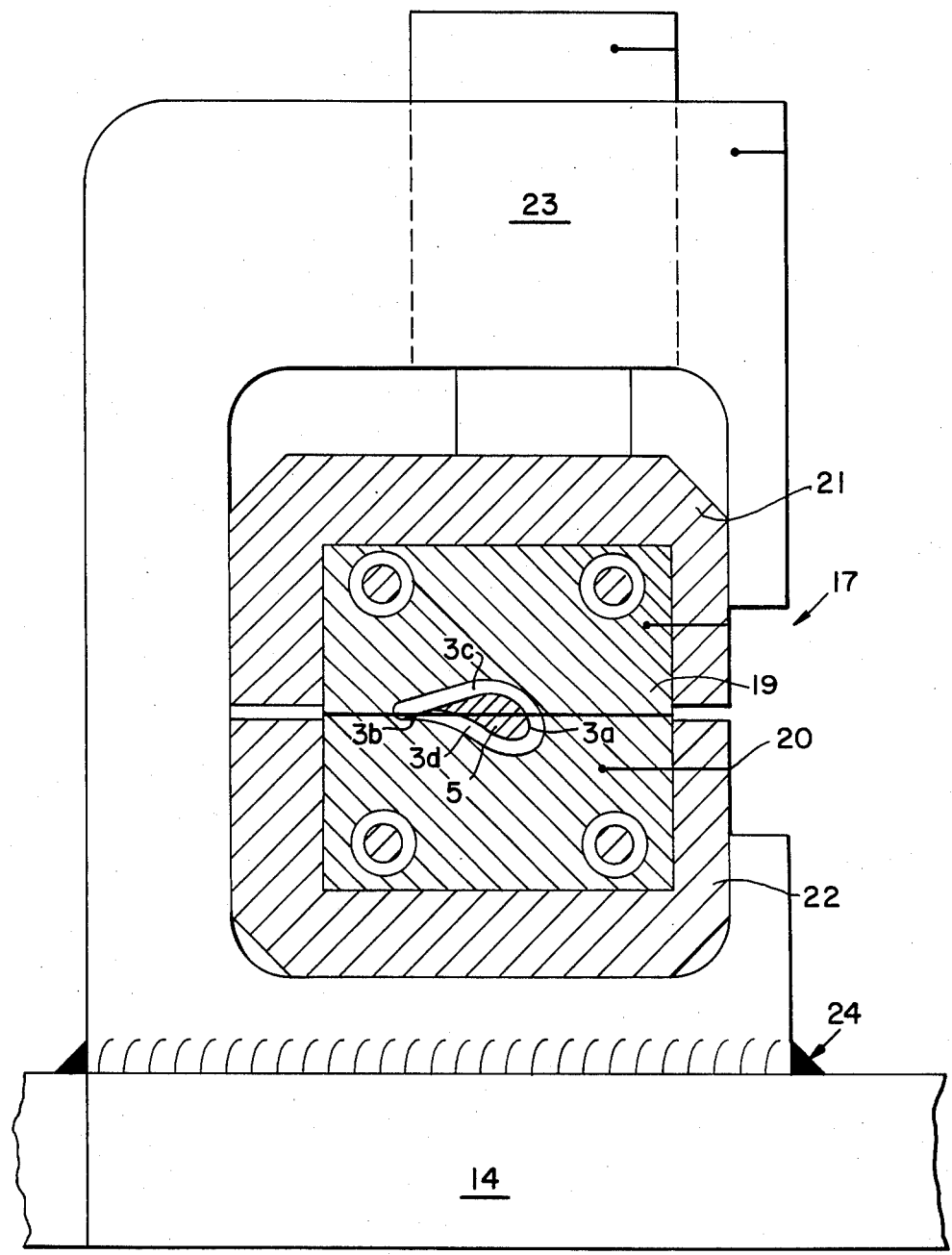
FIG. 3 shows the clamping device of the upsetting device according to FIG. 2, in side view, with a clamped guide blade for cold deformation by means of a staggered riveting process.

FIG. 3 shows a clamping unit 17 in section. The profiled bar 5 is in this case firmly clamped between the clamping jaws 19 and 20, made, e.g., of copper. The unit 17 also includes an upper clamping tool 21 and a lower clamping tool 22, which are pushed together with the aid of the action of the forces of a hydraulic cylinder 23. The entire clamping unit 17 is firmly connected to the base plate 14 by a peripheral welding seam 24.

As shown in FIG. 3, each of the jaws 19 and 20 conform to the shape to an upper or lower half of the blank 5. The jaws are pushed against each other to clamp the blank since they are held by the tools 21 and 22. It is also noted that the blank which ultimately forms the guide blade 3, has a leading rounded edge 3a, a trailing sharp edge 3b, an upper convex surface 3c which extends smoothly between edges 3a and 3b, and a lower concave surface 3d which extends smoothly between edges 3a and 3b.

Since the method for the manufacture of a guide blade according to the invention is uncomplicated and can be carried out inexpensively, and yields a substantial increase of the strength and stability conditions in the zone of the soldered joint between a vane ring and the guide blade, without disturbing the sensitive flow conditions in the region of the vane ring, and the material structure suffers no damaging embrittlement, it is possible to speak of an ideal solution to the task as set forth above.

In a further embodiment, the thickening of the blade base can also be carried out by a rolling operation. By a cutting roller, a cut can be effected, which is then rolled out by the shoulders of the cutting roller into the desired thickening, unless the rolling of the thickening is effected by a separate, following cylinder or roller. This involves a cutting-pressing operation. In this respect, known pressure rolls on appropriate machines would be used. What remains in essence is that with this embodiment of the method of the invention, too, a baselike thickening is upset in a cold state. Appropriately, this can also be effected directly by pressure rollers without a prior cut.

I claim:

1. A method for manufacturing a guide blade for a turbine or compresser guide wheel, using a profiled bar having a cross sectional shape corresponding to the cross section of the guide blade and made of heat and corrosion resistant metal, comprising cutting an axially oversized length of the profiled bar which is axially longer than a final length for the guide blade, to form a blank having the guide blade cross sectional shape, upsetting one end of the blank while in its cold state to form a base-like thickening at said one end of the blank using a riviting process and by applying a rapid succession of impulses to said one end of the blank during a cold plastic state thereof, and forming a soldering surface on said base-like thickening, said soldering surface being adapted to be soldered to a guide wheel.

2. A method according to claim 1, wherein said one end of the blank is upset to form a base-like thickening having an axial depth which is small compared to a width of the base-like thickening in a direction transverse to the axial direction of the blank.

3. A method according to claims 1 or 2, comprising applying the impulses using a reciprocating hammer which moves in a direction extending at an angle to the axial direction of the blank to effect a staggered riveting process.

4. A method according to claim 3, including clamping the blank at a fixed location while exposing said one end and an opposite end of said blank, performing said staggered riveting process at said one end of said blank and performing an additional riveting process at said opposite end of said blank using a succession of impulses on said opposite end of said blank.

5. A method according to claim 1, comprising applying the impulses using a reciprocating hammer which moves in a direction extending at an angle to the axial direction of the blank to effect a staggered riveting process.

6. A method according to claim 1, wherein said blank has an axial length which is greater than twice the axial length of the completed guide blade and upsetting an opposite end of said blank from said one end to form a second base-like thickening at said opposite end, said method including cutting said blank in two to form two guide blank portions, one portion having said first mentioned base-like thickening and the other portion having said second base-like thickening.

7. A method according to claim 1, including forming an opposite soldering surface at an opposite end of said blank from said one end thereof, burring said base-like thickening at said one end of said blank, thereafter forming said soldering surface at said one end of said blank and lastly deburring said blank at both ends thereof.

8. A turbine guide blade made according to the method of claim 1 and comprising a blank with said cold upset base-like thickening at said one end thereof and a second soldering surface at an opposite end thereof.

9. A turbine guide blade according to claim 8, wherein said blank at said base-like thickening has a modified fine-grained structure compared to the material of a remainder of said blank away from said base-like thickening, which is produced by said cold state upsetting of said one end of said blank.

10. A turbine guide blade according to claim 9, wherein said base-like thickening has a core and an edge zone both of which are hardened only to a minor extent, giving the core an edge sufficient structural toughness to act as a guide blade.

11. A turbine guide blade according to claim 10, wherein said soldering surface has a surface area which is greater than said soldering surface at said opposite end of said blank by a factor of 1.5 to 2.

* * * * *